(12) United States Patent
Nakamura et al.

(10) Patent No.: US 12,541,912 B2
(45) Date of Patent: Feb. 3, 2026

(54) INFORMATION PROCESSING APPARATUS AND INFORMATION PROCESSING METHOD

(71) Applicant: SONY GROUP CORPORATION, Tokyo (JP)

(72) Inventors: Keisuke Nakamura, Tokyo (JP); Hiroshi Yamaguchi, Tokyo (JP); Tsuyoshi Ishikawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 322 days.

(21) Appl. No.: 18/003,287

(22) PCT Filed: May 31, 2021

(86) PCT No.: PCT/JP2021/020672
§ 371 (c)(1),
(2) Date: Dec. 23, 2022

(87) PCT Pub. No.: WO2022/004233
PCT Pub. Date: Jan. 6, 2022

(65) Prior Publication Data
US 2023/0245377 A1    Aug. 3, 2023

(30) Foreign Application Priority Data
Jul. 1, 2020    (JP) .............................. 2020-113932

(51) Int. Cl.
*G06T 15/20* (2011.01)
(52) U.S. Cl.
CPC .................. *G06T 15/20* (2013.01)

(58) Field of Classification Search
None
See application file for complete search history.

(56) References Cited

U.S. PATENT DOCUMENTS

| 10,006,505 | B2* | 6/2018 | Lemay | G01C 21/3626 |
|---|---|---|---|---|
| 2012/0120194 | A1* | 5/2012 | Newton | H04N 13/194 |
| | | | | 348/E13.064 |
| 2015/0294511 | A1* | 10/2015 | Nishioka | H04N 23/73 |
| | | | | 345/420 |
| 2018/0087918 | A1* | 3/2018 | Yamashita | G01C 21/3655 |

FOREIGN PATENT DOCUMENTS

| CN | 109891899 A | 6/2019 |
|---|---|---|
| JP | H08263690 A | 10/1996 |
| JP | 11-259672 A | 9/1999 |

(Continued)

OTHER PUBLICATIONS

International Search Report and Written Opinion of PCT Application No. PCT/JP2021/020672, issued on Jun. 29, 2021, 09 pages of ISRWO.

*Primary Examiner* — Robert J Craddock
(74) *Attorney, Agent, or Firm* — CHIP LAW GROUP

(57) ABSTRACT

For example, reproduction processing based on each of 2D data and 3D data is switched.
There is provided an information processing apparatus including a switching control unit that acquires the 2D data and the 3D data on the same subject and controls switching between first reproduction processing based on the 2D data and second reproduction processing based on the 3D data.

16 Claims, 15 Drawing Sheets

(56) References Cited

FOREIGN PATENT DOCUMENTS

| JP | 2000-076488 | A | 3/2000 |
| JP | 2001-291120 | A | 10/2001 |
| JP | 2002-042152 | A | 2/2002 |
| JP | 2003141560 | A | 5/2003 |
| JP | 2014044569 | A | 3/2014 |
| JP | 2017018246 | A | 1/2017 |
| JP | 2020054794 | A | 4/2020 |

* cited by examiner

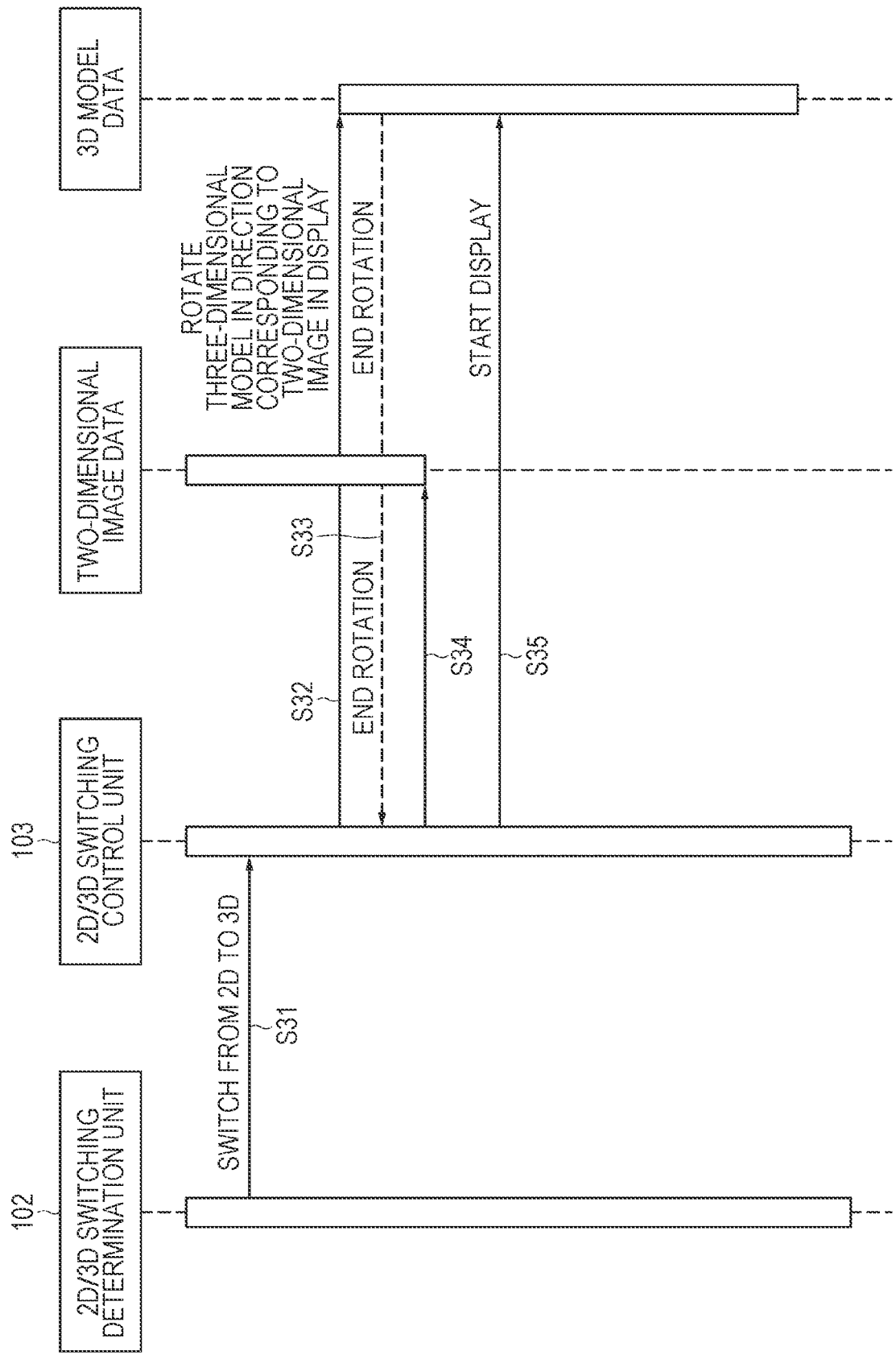

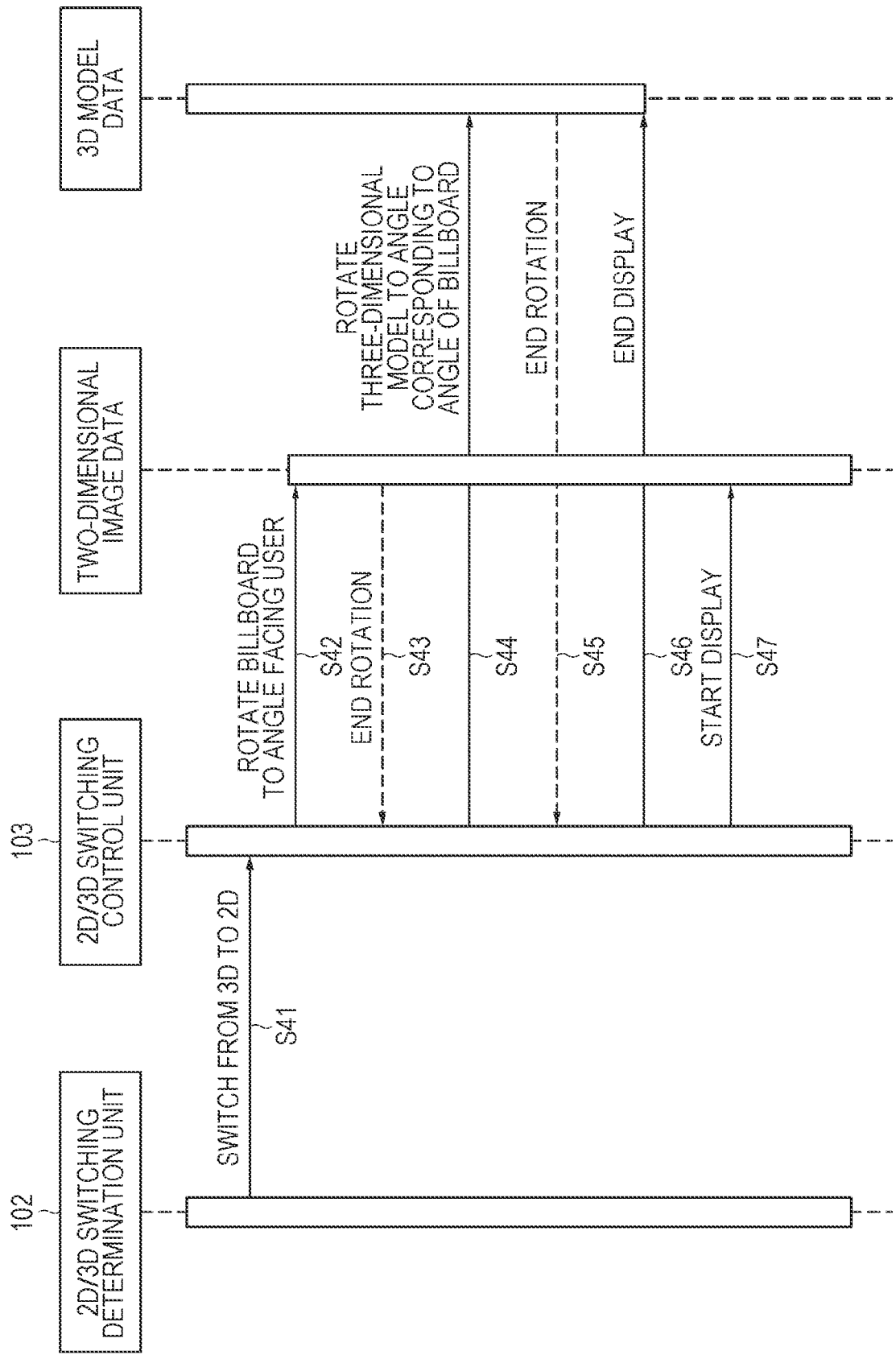

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2021/020672 filed on May 31, 2021, which claims priority benefit of Japanese Patent Application No. JP 2020-113932 filed in the Japan Patent Office on Jul. 1, 2020. Each of the above-referenced applications is hereby incorporated herein by reference in its entirety.

TECHNICAL FIELD

The present disclosure relates to an information processing apparatus, an information processing method, and a program.

BACKGROUND ART

A technology for rendering a 3D model of a model space has been proposed (for example, the technology described in Patent Document 1).

CITATION LIST

Patent Document

Patent Document 1: Japanese Patent Application Laid-Open No. 2001-291120

SUMMARY OF THE INVENTION

Problems to be Solved by the Invention

In general, drawing a three-dimensional model having a large number of polygons requires a large calculation load and a large number of calculation resources. Therefore, it is desirable to hold two-dimensional data (2D data) having a relatively small calculation load in processing and use the two-dimensional data (2D data) appropriately for the processing for the three-dimensional data (3D data).

An object of the present disclosure is to provide an information processing apparatus, an information processing method, and a program that appropriately switch between first reproduction processing based on 2D data and second reproduction processing based on 3D data.

Solutions to Problems

According to the present disclosure, for example,
there is provided an information processing apparatus including
a switching control unit that acquires 2D data and 3D data on the same subject and controls switching between first reproduction processing based on the 2D data and second reproduction processing based on the 3D data.
According to the present disclosure, for example,
there is provided an information processing method,
in which a switching control unit acquires 2D data and 3D data on the same subject and controls switching between first reproduction processing based on the 2D data and second reproduction processing based on the 3D data.
According to the present disclosure, for example,
there is provided a program that causes a computer to execute an information processing method,
in which a switching control unit acquires 2D data and 3D data on the same subject and controls switching between first reproduction processing based on the 2D data and second reproduction processing based on the 3D data.

BRIEF DESCRIPTION OF DRAWINGS

FIG. 15 is a sequence diagram for explaining processing performed in the third embodiment.
FIG. 16 is a sequence diagram for explaining processing performed in the third embodiment.

MODE FOR CARRYING OUT THE INVENTION

The following is a description of embodiments and the like of the present disclosure with reference to the drawings. Note that the description will be given in the following order.
<Technology related to the present disclosure>
<First Embodiment>
<Second Embodiment>
<Third Embodiment>
<Modification Example>
<Application example>
The embodiments and the like described below are preferred specific examples of the present disclosure, and the content of the present disclosure is not limited to these embodiments and the like.

Technology Related to the Present Disclosure

First, in order to facilitate understanding of the present disclosure, a technology related to the present disclosure will be described. The technology related to the present disclosure described below can be applied to the present disclosure.

[Outline of Information Processing System]

Figure 1:
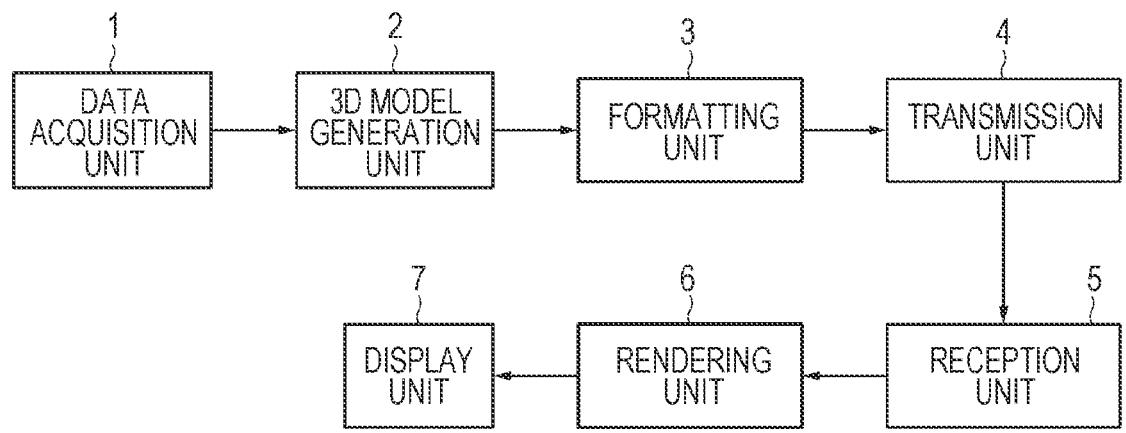
FIG. 1 is a diagram to be referred to in explanation of a technology related to the present disclosure.
Figure 2:
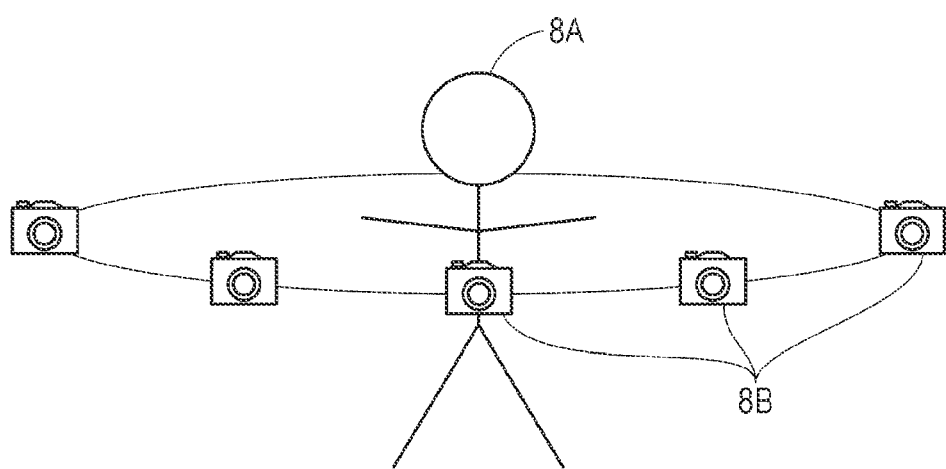
FIG. 2 is a diagram to be referred to in explanation of the technology related to the present disclosure.

FIG. 1 illustrates an outline of an information processing system to which the present technology is applied. A data acquisition unit 1 acquires image data for generating a 3D model of a subject. For example, as illustrated in FIG. 2, a plurality of viewpoint images captured by a plurality of imaging devices 8B arranged to surround a subject 8A is acquired as image data. In this case, the plurality of viewpoint images is preferably images captured by a plurality of cameras in synchronization. Furthermore, the data acquisition unit 1 may acquire, for example, a plurality of viewpoint images obtained by imaging the subject 8A from a plurality of viewpoints by one camera as image data. Furthermore, the data acquisition unit 1 may acquire, for example, one captured image of the subject 8A as image data. In this case, a 3D model generation unit 2 that will be described later generates a 3D model using, for example, machine learning.

Note that the data acquisition unit 1 may perform calibration on the basis of the image data and acquire the internal parameters and the external parameters of each imaging device 8B. Furthermore, the data acquisition unit 1 may acquire, for example, a plurality of pieces of depth information indicating distances from viewpoints at a plurality of locations to the subject 8A.

The 3D model generation unit 2 generates a model having three-dimensional information of the subject 8A on the basis of image data for generating a 3D model of the subject 8A. The 3D model generation unit 2 generates the 3D model of the subject 8A by, for example, scraping the three-dimensional shape of the subject 8A using images from a plurality of viewpoints (for example, silhouette images from a plurality of viewpoints) using a so-called visual hull. In this case, the 3D model generation unit 2 can further deform the 3D model generated using the visual hull with high accuracy using a plurality of pieces of depth information indicating distances from viewpoints at a plurality of locations to the subject 8A. Furthermore, for example, the 3D model generation unit 2 may generate the 3D model of the subject 8A from one captured image of the subject 8A. The 3D model generated by the 3D model generation unit 2 can also be referred to as a moving image of the 3D model when the 3D model is generated in units of time-series frames. Furthermore, since the 3D model is generated using an image captured by the imaging device 8B, the 3D model can also be referred to as a live-action 3D model. The 3D model can express shape information indicating the surface shape of the subject 8A in the form of mesh data expressed by a connection between vertices called a polygon mesh, for example. The method of expressing the 3D model is not limited thereto, and the 3D model may be described by a so-called point cloud expression method expressed by point position information.

Color information data is also generated as a texture in association with the 3D shape data. For example, there are a case of a view independent texture in which a color is constant when viewed from any direction and a case of a view dependent texture in which a color changes depending on a viewing direction.

A formatting unit 3 (encoding unit) converts the data of the 3D model generated by the 3D model generation unit 2 into a format suitable for transmission and accumulation. For example, the 3D model generated by the 3D model generation unit 2 may be converted into a plurality of two-dimensional images by performing perspective projection from a plurality of directions. In this case, depth information that is two-dimensional depth images from a plurality of viewpoints may be generated using the 3D model. The depth information and the color information of the state of the two-dimensional image are compressed and output to a transmission unit 4. The depth information and the color information may be transmitted side by side as one image or may be transmitted as two separate images. In this case, since it is in the form of two-dimensional image data, it can be compressed using a two-dimensional compression technology such as advanced video coding (AVC).

Furthermore, for example, the 3D data may be converted into a point cloud format. The three-dimensional data may be output to the transmission unit 4. In this case, for example, a three-dimensional compression technology of a geometry-based approach discussed in MPEG can be used.

The transmission unit 4 transmits the transmission data formed by the formatting unit 3 to a reception unit 5. The transmission unit 4 performs a series of processing of the data acquisition unit 1, the 3D model generation unit 2, and the formatting unit 3 offline, and then transmits the transmission data to the reception unit 5. In addition, the transmission unit 4 may transmit the transmission data generated from the series of processing described above to the reception unit 5 in real time.

The reception unit 5 receives the transmission data transmitted from the transmission unit 4.

A rendering unit 6 performs rendering using the transmission data received by the reception unit 5. For example, texture mapping is performed in which a mesh of a 3D model is projected from a viewpoint of a camera that draws the mesh, and a texture representing a color or a pattern is pasted. The drawing at this time can be set in any manner and viewed from a free viewpoint regardless of the camera position at the time of capturing an image.

For example, the rendering unit 6 performs texture mapping of pasting a texture representing the color, pattern, or texture of the mesh according to the position of the mesh of the 3D model. Regarding the texture mapping, there are a so-called view dependent method in which the viewing viewpoint of the user is considered and a so-called view independent method in which the viewing viewpoint of the user is not considered. Since the view dependent method changes the texture to be pasted on the 3D model according to the position of the viewing viewpoint, there is an advantage that high quality rendering can be realized as compared with the view independent method. On the other hand, since the view independent method does not consider the position of the viewing viewpoint, there is an advantage that the processing amount is reduced as compared with the view dependent method. Note that the viewing viewpoint data is input from the display device to the rendering unit 6 after the display device detects a viewing location (region of interest) of the user. Furthermore, the rendering unit 6 may adopt, for example, billboard rendering for rendering an object so that the object maintains a vertical posture with respect to the viewing viewpoint. For example, when rendering a plurality of objects, objects of low interest to the viewer may be rendered in a billboard, and other objects may be rendered with other rendering methods.

The display unit 7 displays the result rendered by the rendering unit 6 on the display unit 7 of the display device. The display device may be a 2D monitor or a 3D monitor, for example, a head-mounted display, a spatial display, a mobile phone, a television, a PC, or the like.

The information processing system in FIG. 1 illustrates a series of flow from the data acquisition unit 1 that acquires a captured image that is a material for generating content to the display control unit that controls the display device viewed by the user. However, this does not mean that all functional blocks are necessary for implementation of the present technology, and the present technology can be implemented for each functional block or a combination of a plurality of functional blocks. For example, in FIG. 1, the transmission unit 4 and the reception unit 5 are provided in order to illustrate a series of flow from a content creating side to a content viewing side through distribution of content data, but in a case where content creation to viewing are performed by the same information processing apparatus (for example, a personal computer), it is not necessary to include the encoding unit, the transmission unit 4, the decoding unit, or the reception unit 5.

When the present information processing system is implemented, the same implementer may implement all the processes, or different implementers may implement each functional block. As an example, a company A generates 3D content through the data acquisition unit 1, the 3D model generation unit 2, and the formatting unit 3. Then, it is conceivable that the 3D content is distributed through the transmission unit 4 (platform) of a company B, and the display device of a company C performs reception, rendering, and display control of the 3D content.

In addition, each functional block can be implemented on a cloud. For example, the rendering unit 6 may be implemented in a display device or may be implemented by a server. In this case, information is exchanged between the display device and the server.

In FIG. 1, the data acquisition unit 1, the 3D model generation unit 2, the formatting unit 3, the transmission unit 4, the reception unit 5, the rendering unit 6, and the display unit 7 are collectively described as an information processing system. However, the information processing system of the present specification is referred to as an information processing system when two or more functional blocks are involved, and for example, the data acquisition unit 1, the 3D model generation unit 2, the encoding unit, the transmission unit 4, the reception unit 5, the decoding unit, and the rendering unit 6 can be collectively referred to as an information processing system without including the display unit 7.

[Processing Flow of Information Processing System]

Figure 3:
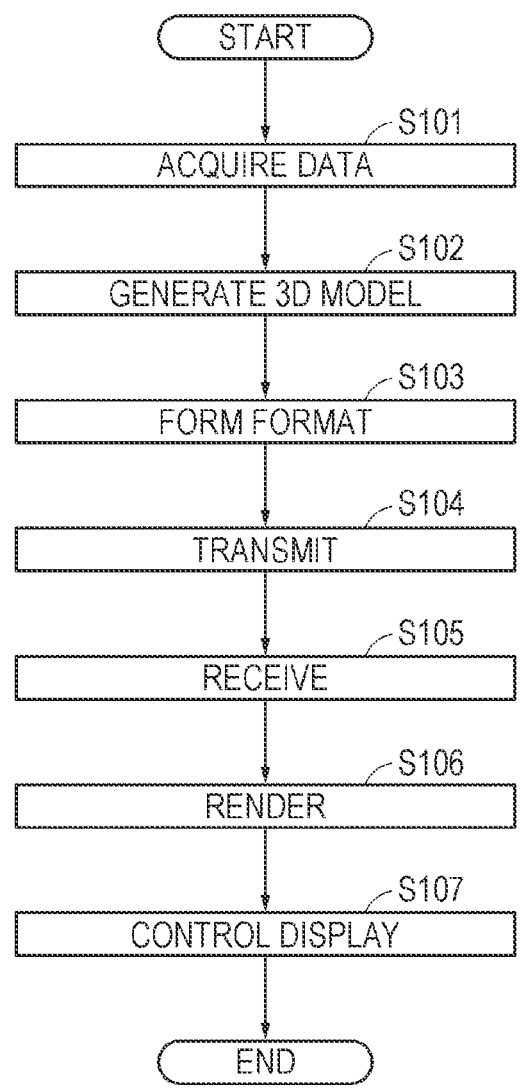
FIG. 3 is a diagram to be referred to in explanation of the technology related to the present disclosure.

An example of a processing flow of the information processing system will be described with reference to a flowchart of FIG. 3.

When the processing is started, in step S101, the data acquisition unit 1 acquires image data for generating a 3D model of the subject 8A. In step S102, the 3D model generation unit 2 generates a model having three-dimensional information of the subject 8A on the basis of image data for generating a 3D model of the subject 8A. In step S103, the formatting unit 3 encodes the shape and texture data of the 3D model generated by the 3D model generation unit 2 into a format suitable for transmission and accumulation. In step S104, the transmission unit 4 transmits the encoded data, and in step S105, the reception unit 5 receives the transmitted data. In step S106, the decoding unit performs decoding processing to convert the data into shape and texture data necessary for display, and the rendering unit 6 performs rendering using the shape and texture data. In step S107, the display unit 7 displays the rendering result. When the processing of step S107 ends, the processing of the information processing system ends.

Figure 4:
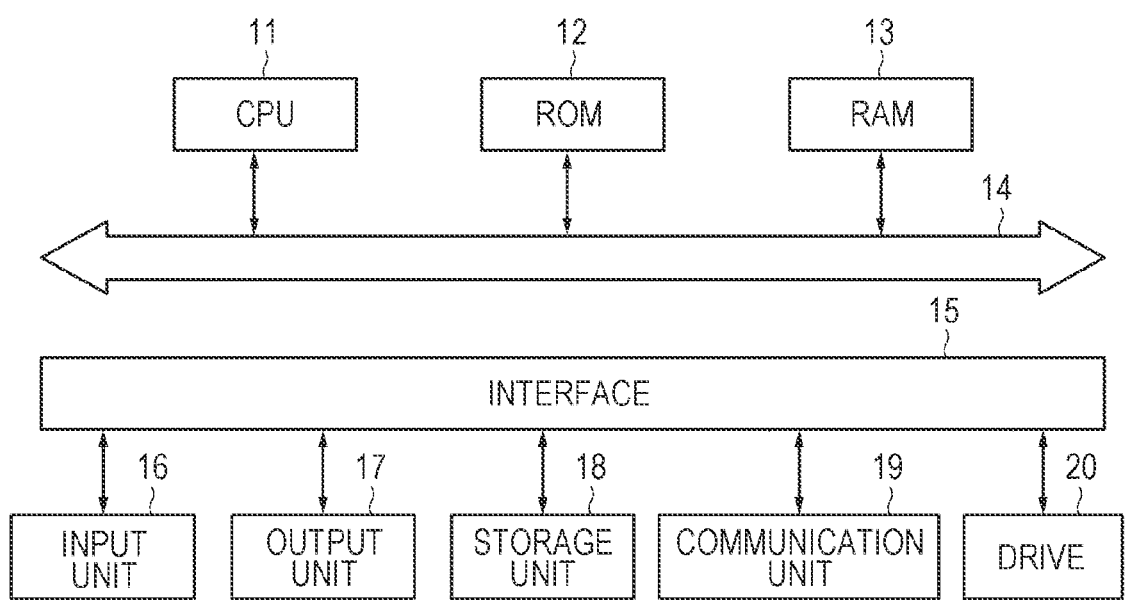
FIG. 4 is a diagram to be referred to in explanation of the technology related to the present disclosure.

FIG. 4 is a block diagram illustrating a configuration example of hardware of a computer that executes the above-described series of processing by a program. In the computer illustrated in FIG. 4, a central processing unit (CPU) 11, a read only memory (ROM) 12, and a random access memory (RAM) 13 are mutually connected via a bus 14. An input/output interface 15 is also connected to the bus 14. An input unit 16, an output unit 17, a storage unit 18, a communication unit 19, and a drive 20 are connected to the input/output interface 15. The input unit 16 includes, for example, a keyboard, a mouse, a microphone, a touch panel, an input terminal, and the like. The output unit 17 includes, for example, a display, a speaker, an output terminal, and the like. The storage unit 18 includes, for example, a hard disk, a RAM disk, a nonvolatile memory, and the like. The communication unit 19 includes, for example, a network interface. The drive 20 drives a removable medium such as a magnetic disk, an optical disc, a magneto-optical disc, or a semiconductor memory.

In the computer configured as described above, for example, the CPU 11 loads a program stored in the storage unit into the RAM 13 via the input/output interface 15 and the bus 14 and executes the program, whereby the above-described series of processing is performed. The RAM 13 also appropriately stores data and the like necessary for the CPU 11 to execute various types of processing.

The program executed by the computer can be applied, for example, by being recorded in a removable medium as a package medium or the like. In this case, the program can be installed in the storage unit 18 via the input/output interface 15 by attaching the removable medium to the drive 20. Furthermore, this program can also be provided via a wired or wireless transmission medium such as a local area network, the Internet, or digital satellite broadcasting. In this case, the program can be received by the communication unit 19 and installed in the storage unit 18.

First Embodiment

[Configuration Example of Information Processing Apparatus]

Figure 5:
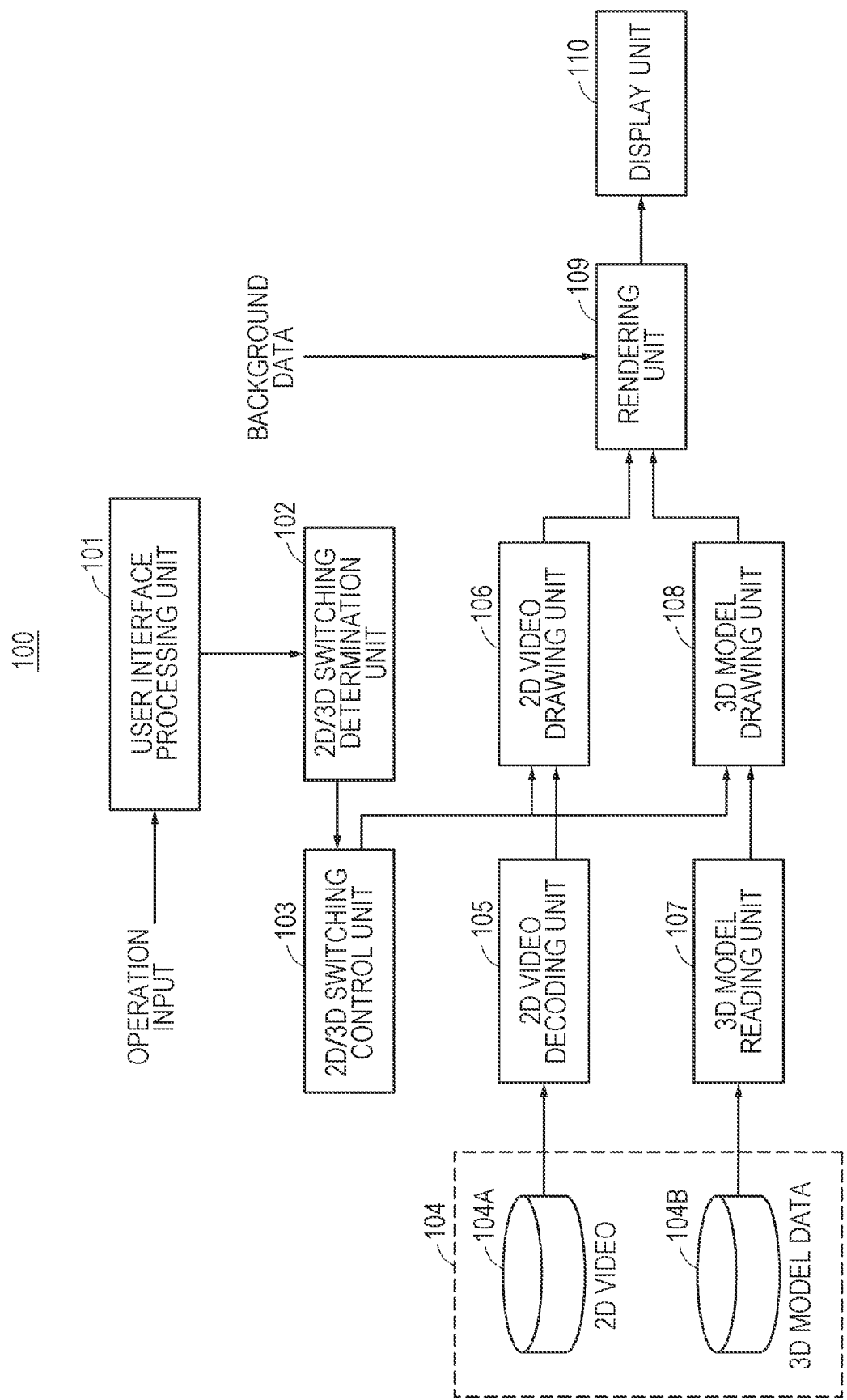
FIG. 5 is a diagram for explaining a configuration example of an information processing apparatus according to a first embodiment.

FIG. 5 is a diagram for explaining a configuration example of the information processing apparatus (information processing apparatus 100) according to the first embodiment. The information processing apparatus 100 can be configured as, for example, a head-mounted display used by being worn on the head of the user. The information processing apparatus 100 may be configured as a display of another form such as a spectacle type.

The information processing apparatus 100 includes a user interface processing unit 101, a 2D/3D switching determination unit 102, a 2D/3D switching control unit 103, a storage unit 104, a 2D video decoding unit 105, a 2D video drawing unit 106, a 3D model reading unit 107, a 3D model drawing unit 108, a rendering unit 109, and a display unit 110.

The user interface processing unit 101 processes an operation input to an operation input unit (not illustrated) such as a controller. For example, when head tracking or a predetermined operation on the controller is performed, the user interface processing unit 101 detects the operation and generates an operation input signal corresponding to the operation. Then, the user interface processing unit 101 supplies the generated operation input signal to the 2D/3D switching determination unit 102.

The 2D/3D switching determination unit 102 determines whether or not to switch between the first reproduction processing based on the 2D data and the second reproduction processing based on the 3D data. In the present embodiment, when a predetermined operation is performed on the controller and an operation input signal corresponding to the operation is supplied from the user interface processing unit 101, the 2D/3D switching determination unit 102 switches the reproduction processing described above. The 2D/3D switching determination unit 102 supplies a switching determination signal for switching the reproduction processing to the 2D/3D switching control unit 103.

The 2D/3D switching control unit 103 controls switching between the first reproduction processing based on the 2D data and the second reproduction processing based on the 3D data with respect to the 2D data and the 3D data on the same subject (also referred to as an object) held in the information processing apparatus 100. Specifically, the 2D/3D switching control unit 103 selectively operates one of the 2D video drawing unit 106 and the 3D model drawing unit 108.

The storage unit 104 holds (stores) 2D data and 3D data, which is a 3D model, on the same subject. Specifically, 2D data of a predetermined subject is stored in the storage unit 104A of the storage unit 104, and 3D data including 3D model data of the same subject is stored in the storage unit 104B of the storage unit 104. Although the storage units are illustrated separately for convenience of description, the 2D data and the 3D data may be stored in the same storage unit. The 2D data may be an image obtained by rendering a three-dimensional model with a virtual camera, or may be an image obtained by extracting only a subject from an imaging result when the subject is captured from a plurality of viewpoints using a physical camera. In addition, as the 2D data, video data obtained as a result of rendering by a monocular virtual camera or capturing an image by a physical camera may be used, or video data obtained by stereoscopically rendering or capturing may be used. In a case where a stereo image obtained using the right eye camera and the left eye camera is used as the 2D data, the user can obtain a stereoscopic effect at the time of two-dimensional image display.

The 2D video decoding unit 105 decodes the 2D video read from the storage unit 104A.

The 2D video drawing unit 106 performs processing of drawing a 2D image under the control of the 2D/3D switching control unit 103. For example, the 2D video drawing unit 106 performs the billboard rendering processing of a predetermined subject as the foreground.

The 3D model reading unit 107 generates a 3D model on the basis of the 3D data read from the storage unit 104B.

The 3D model drawing unit 108 performs processing of drawing a 3D model under the control of the 2D/3D switching control unit 103. For example, the 3D model drawing unit 108 draws the 3D model generated by the 3D model reading unit 107 as a foreground.

The rendering unit 109 draws a background based on the background data with respect to the foreground drawn by the 2D video drawing unit 106 or the foreground drawn by the 3D model drawing unit 108, and combines the foreground and the background. Note that at least the processing performed by the 2D video drawing unit 106 corresponds to the first reproduction processing (for example, billboard rendering), and at least the processing performed by the 3D model drawing unit 108 corresponds to the second reproduction processing (for example, rendering a 3D model). Note that the background data may be stored in the storage unit 104. Furthermore, the background data may be any data such as a two-dimensional model, an omnidirectional picture, or an omnidirectional video in the virtual space.

The display unit 110 is a display that displays a processing result by the rendering unit 109.

[Data Holding Form]

Figure 6:
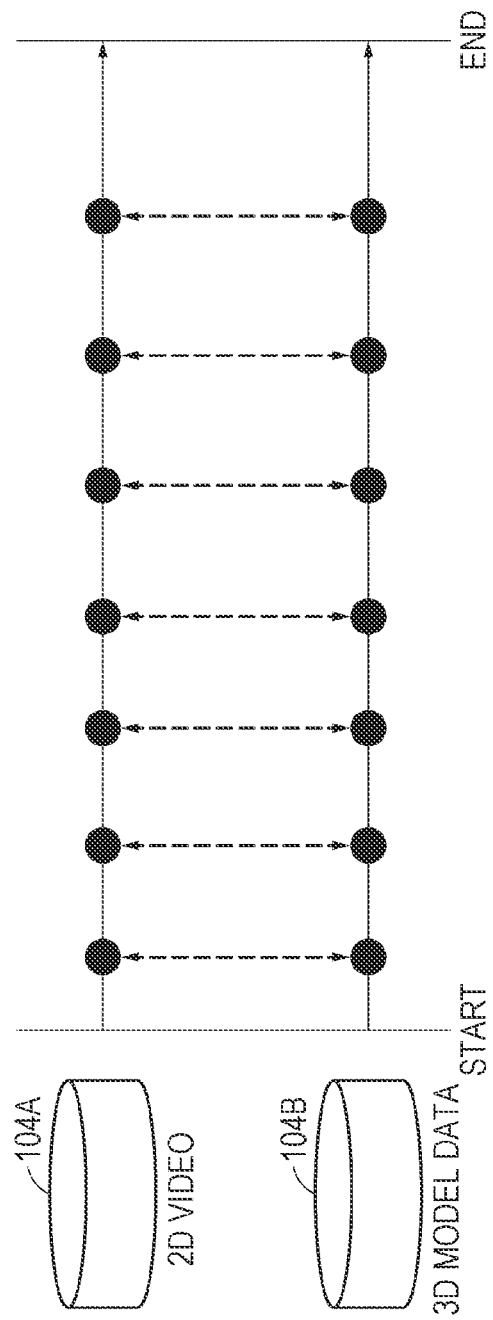
FIG. 6 is a diagram for explaining a data holding form in a storage unit according to the first embodiment.

FIG. 6 is a diagram for explaining a data holding form in the storage unit 104 according to the first embodiment. In the present embodiment, as illustrated in FIG. 6, the 2D data and the 3D model data have matching time-series display content at a predetermined timing indicated by a black circle.

[Operation Example of Information Processing Apparatus]

Figure 7:
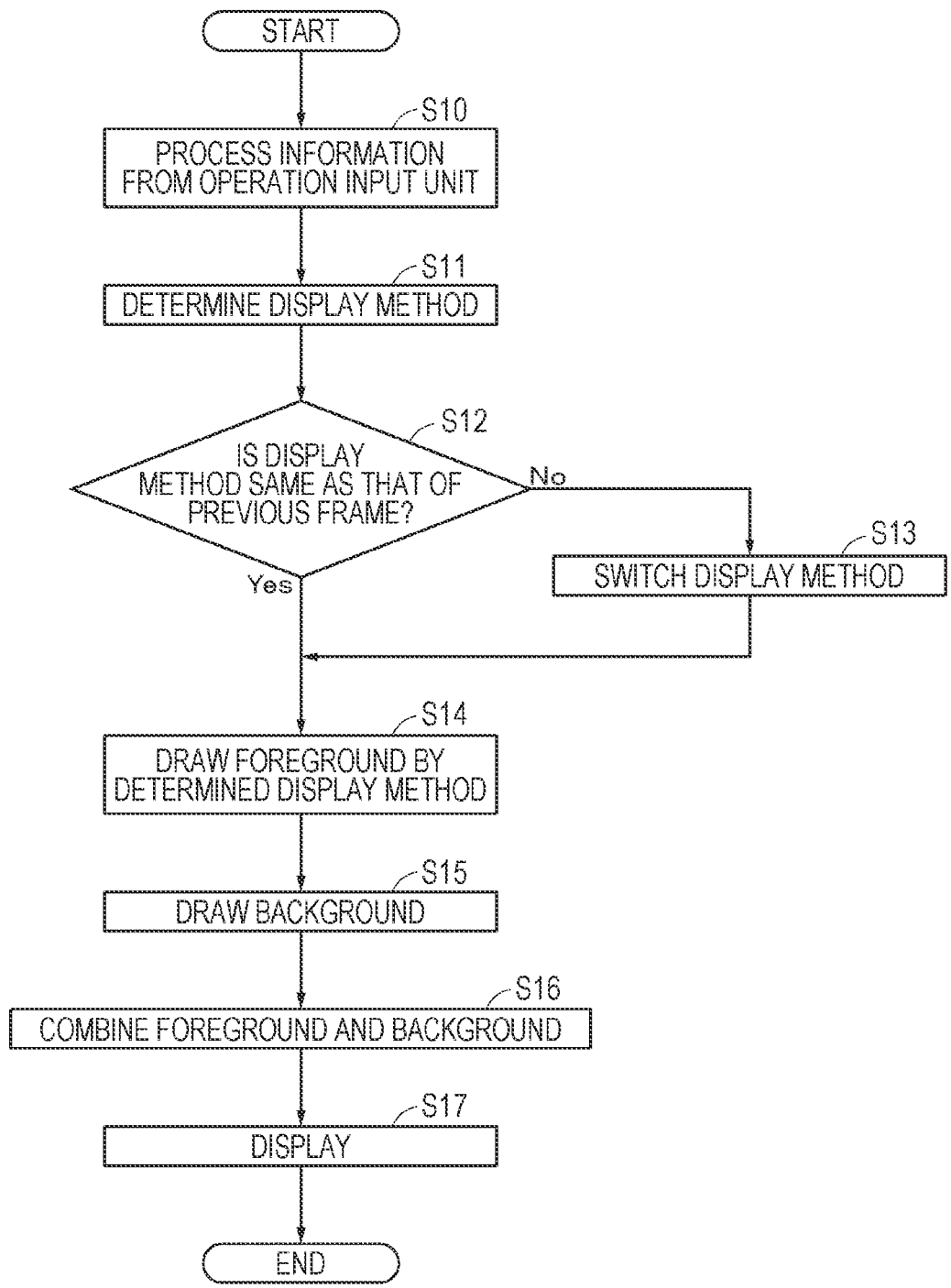
FIG. 7 is a flowchart for explaining an operation example of the information processing apparatus according to the first embodiment.

Next, an operation example of the information processing apparatus 100 will be described with reference to the flowchart illustrated in FIG. 7. Note that the processing illustrated in FIG. 7 is started, for example, when an instruction for video reproduction is given in the information processing apparatus 100. Furthermore, the processing illustrated in FIG. 7 is performed, for example, in units of frames. Note that the processing start timing can be changed as appropriate. In addition, the processing unit can be changed as appropriate, such as a plurality of frames. In the present example, for example, it is assumed that the 2D data reproduction processing and the 3D data reproduction processing are switched at the timing when the operation of pressing the switch button included in the operation input unit is performed.

In step S10, the user interface processing unit 101 processes the information from the operation input unit. For example, the user interface processing unit 101 outputs logical "1" as the operation input signal when the switch button is pressed, and outputs logical "0" as the operation input signal when the switch button is not pressed. The operation input signal is output to the 2D/3D switching determination unit 102. Then, the processing proceeds to step S11.

In step S11, the 2D/3D switching determination unit 102 determines whether to perform the display method on the basis of either the first reproduction processing or the second reproduction processing, based on the operation input signal. For example, the 2D/3D switching determination unit 102 determines to perform the display method based on the first reproduction processing in a case where the operation input signal indicates "1", and determines to perform the display method based on the second reproduction processing in a case where the operation input signal indicates "0". Then, the 2D/3D switching determination unit 102 supplies a switching determination signal indicating a determination result to the 2D/3D switching control unit 103. Then, the processing proceeds to step S12.

In step S12, the 2D/3D switching control unit 103 determines whether or not the display method for the current frame is the same as the display method in the previous frame on the basis of the switching determination signal. In a case where the display method for the current frame is different from the display method in the previous frame, the processing proceeds to step S13. In a case where the display method for the current frame is the same as the display method in the previous frame, the processing proceeds to step S14.

In step S13, the 2D/3D switching control unit 103 performs control to switch the display method. Specifically, the 2D/3D switching control unit 103 selects the 2D video drawing unit 106 or the 3D model drawing unit 108 to be operated so that the display method after switching is performed. Then, the processing proceeds to step S14.

In step S14, processing of drawing the foreground by the determined display method is performed. That is, under the control of the 2D/3D switching control unit 103, the 2D video drawing unit 106 draws the object as the foreground by the billboard rendering, or the 3D model drawing unit 108 draws the 3D model as the foreground. Then, the processing proceeds to step S15.

In step S15, the rendering unit 109 draws the background. Then, the processing proceeds to step S16.

In step S16, the drawn foreground and the background are combined. Then, the processing proceeds to step S17.

In step S17, the combined data is displayed on the display unit 110.

According to the present embodiment described above, the reproduction processing based on the 2D data and the reproduction processing based on the 3D data can be switched at any timing. Furthermore, by performing the reproduction processing based on the 2D data, the calculation load can be reduced as compared with the case where the reproduction processing based on the 3D data is always performed.

Modification Example of First Embodiment

In the above description, the reproduction processing based on the 2D data and the reproduction processing based on the 3D data are switched at the timing when the predetermined operation is performed on the controller. However, the predetermined timing may be determined according to the relative positional relationship between the predetermined position and the user position in the virtual space, instead of the timing at which the predetermined operation is performed on the controller.

Figure 8A:
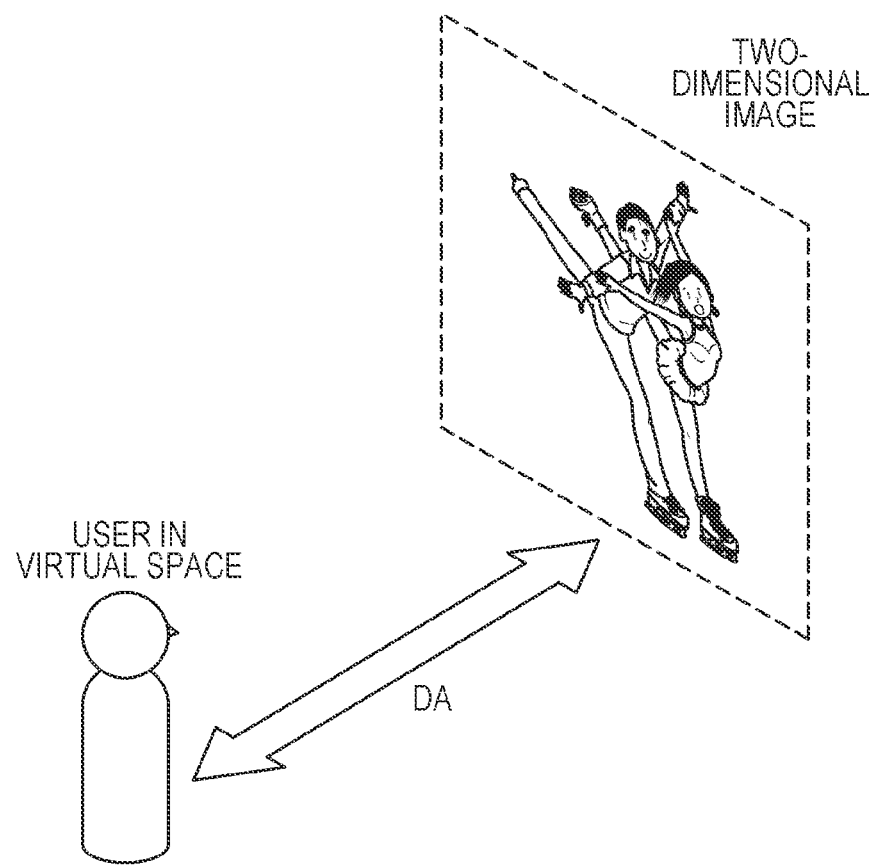
FIGS. 8A and 8B are diagrams for explaining a modification example of the first embodiment.
Figure 8B:
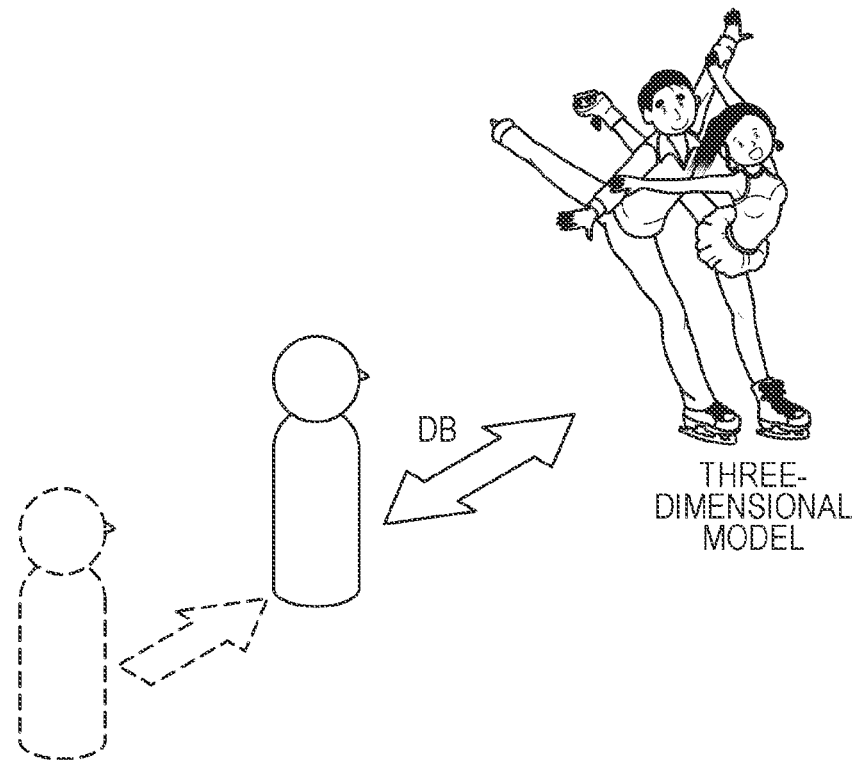

Examples of the relative positional relationship include a distance between a predetermined position and a user position. The predetermined position is, for example, a position in the virtual space where the object is displayed, and the user position is a position of the user in the virtual space. A threshold value Dth is set as the threshold value of the distance. As illustrated in FIG. 8A, in a case where the distance between the display position of the object (for example, two persons who skate) and the user position is a distance DA larger than a threshold value Dth, the object is reproduced by the reproduction processing based on the 2D data. Then, as illustrated in FIG. 8B, in a case where the position of the user approaches the display position of the object and reaches the distance DB smaller than the threshold value Dth, the object is reproduced in the three-dimensional model by the reproduction processing based on the 3D data. Note that the change in the user position may be a change in a virtual position by the user operating the controller or the like, or may be a change in a position accompanying actual movement of the user wearing the information processing apparatus 100. By performing such processing, the distant object can be displayed by the reproduction processing based on the 2D data with a small calculation load, and the object at a close distance requiring a stereoscopic effect can be displayed by the reproduction processing based on the 3D data capable of reproducing the stereoscopic effect more.

Figure 9A:
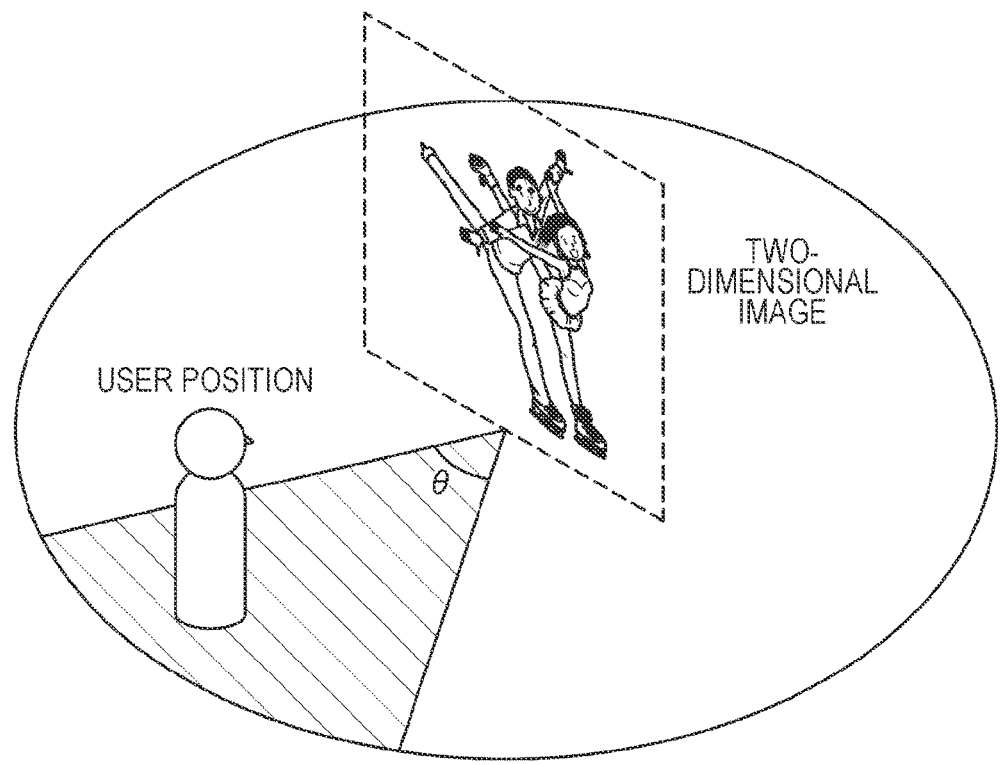
FIGS. 9A and 9B are diagrams for explaining a modification example of the first embodiment.
Figure 9B:
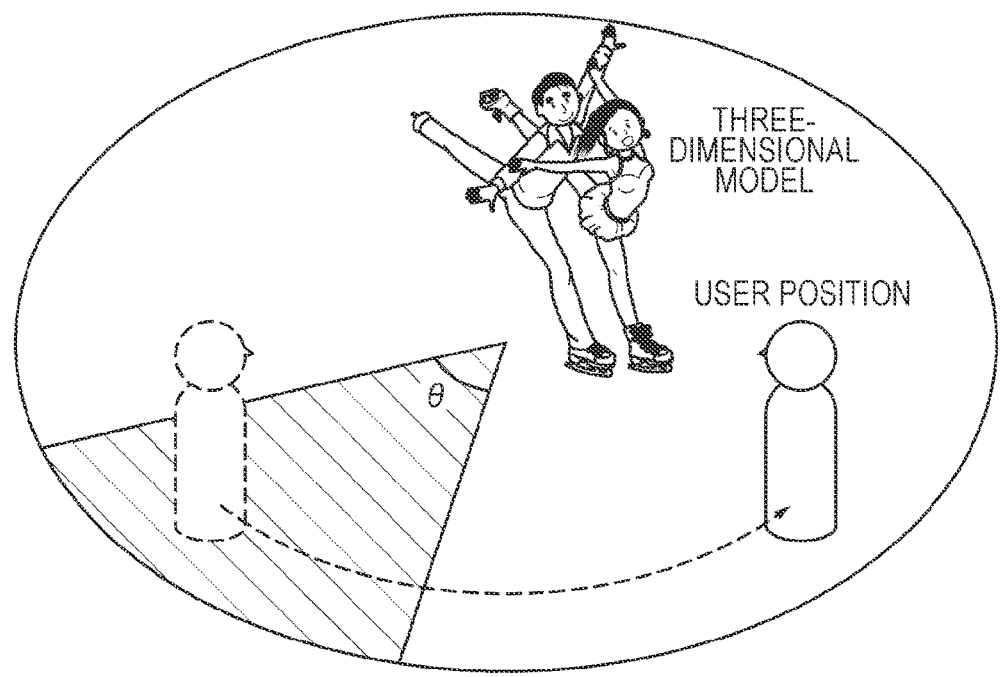

Furthermore, the relative positional relationship may be a positional relationship between a range of angles set with reference to a predetermined position and the user position. For example, as illustrated in FIG. 9A, the angle θ is defined in the forward direction with reference to the position of the object in the virtual space. The angle θ is defined to be a front region when viewed from a plane on which a two-dimensional image of an object to be viewed is displayed. In a case where the user position is in the range corresponding to the angle θ, the object is displayed by the reproduction processing based on the 2D data. As illustrated in FIG. 9B, in a case where the user position is not in the range corresponding to the angle θ, the object is displayed in the 3D model by the reproduction processing based on the 3D data. Note that the user position can be specified by a viewpoint with respect to the object or a position sensor provided in the information processing apparatus 100.

Note that the two examples regarding the relative positional relationship described above may be combined. For example, even in a case where the user position is in a region to be displayed as a two-dimensional image, when the distance between the object and the user is smaller than a set threshold value Dth, it may be determined that switching is performed to display the object in the three-dimensional display format.

Second Embodiment

Next, a second embodiment will be described. The matters described in the first embodiment can be applied to the second embodiment unless otherwise specified. In addition, the same reference numerals are given to the same or similar configurations as those described in the first embodiment, and redundant description will be appropriately omitted.

Figure 10:
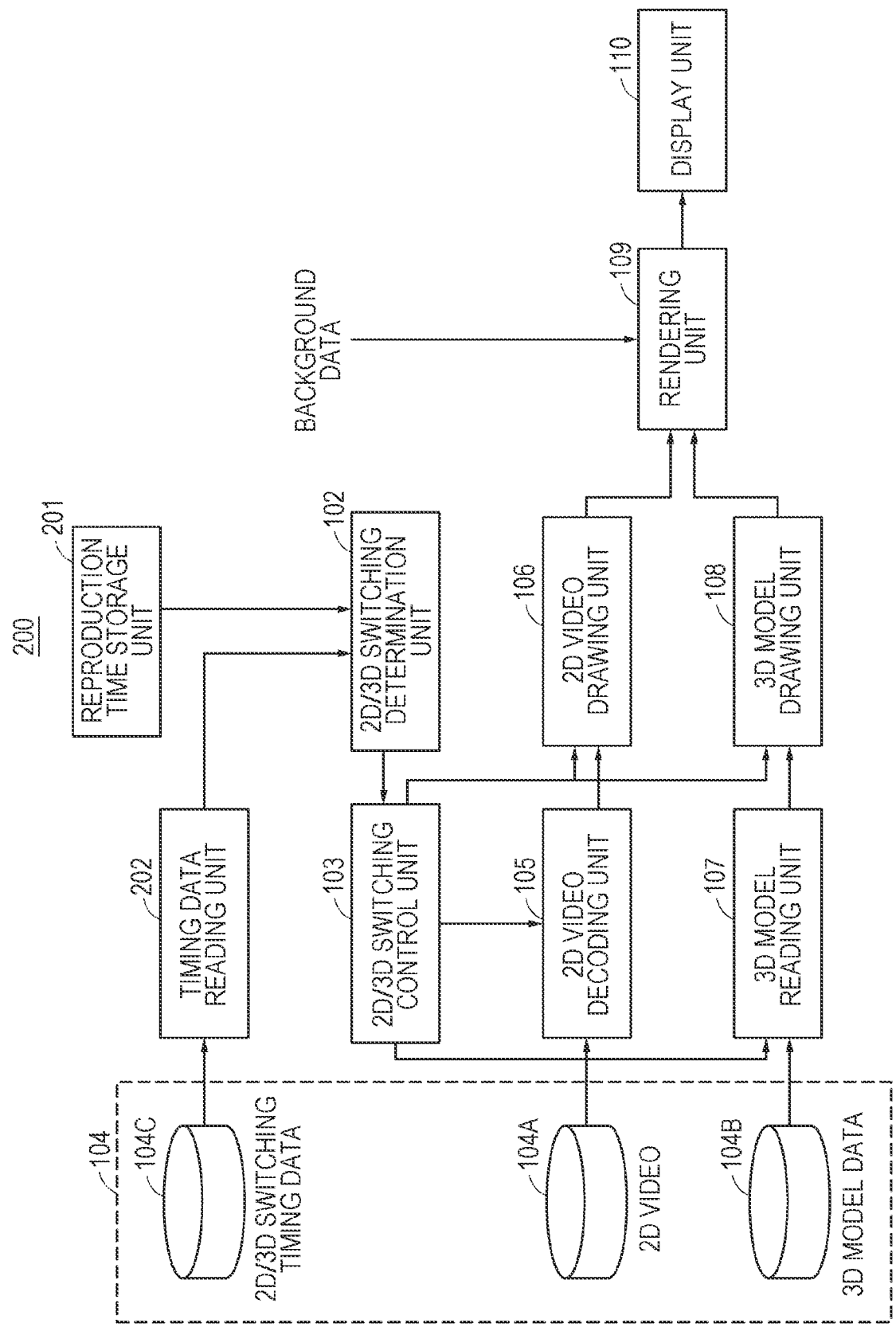
FIG. 10 is a diagram for explaining a configuration example of an information processing apparatus according to a second embodiment.

FIG. 10 is a block diagram illustrating a configuration example of an information processing apparatus (information processing apparatus 200) according to the second embodiment. The information processing apparatus 200 is different from the information processing apparatus 100 in that the information processing apparatus 200 includes a reproduction time storage unit 201 and a timing data reading unit 202. In addition, the storage unit 104 of the information processing apparatus 200 includes a storage unit 104C. Switching timing data indicating a timing at which the reproduction processing based on the 2D data and the reproduction processing based on the 3D data are switched is stored in the storage unit 104C. The switching timing data is set in advance, for example.

The reproduction time storage unit 201 stores a reproduction time which is a time from the reproduction start timing of the video. The reproduction time is supplied to the 2D/3D switching determination unit 102. The timing data reading unit 202 reads the switching timing data from the storage unit 104C, and supplies the result to the 2D/3D switching determination unit 102.

Figure 11:
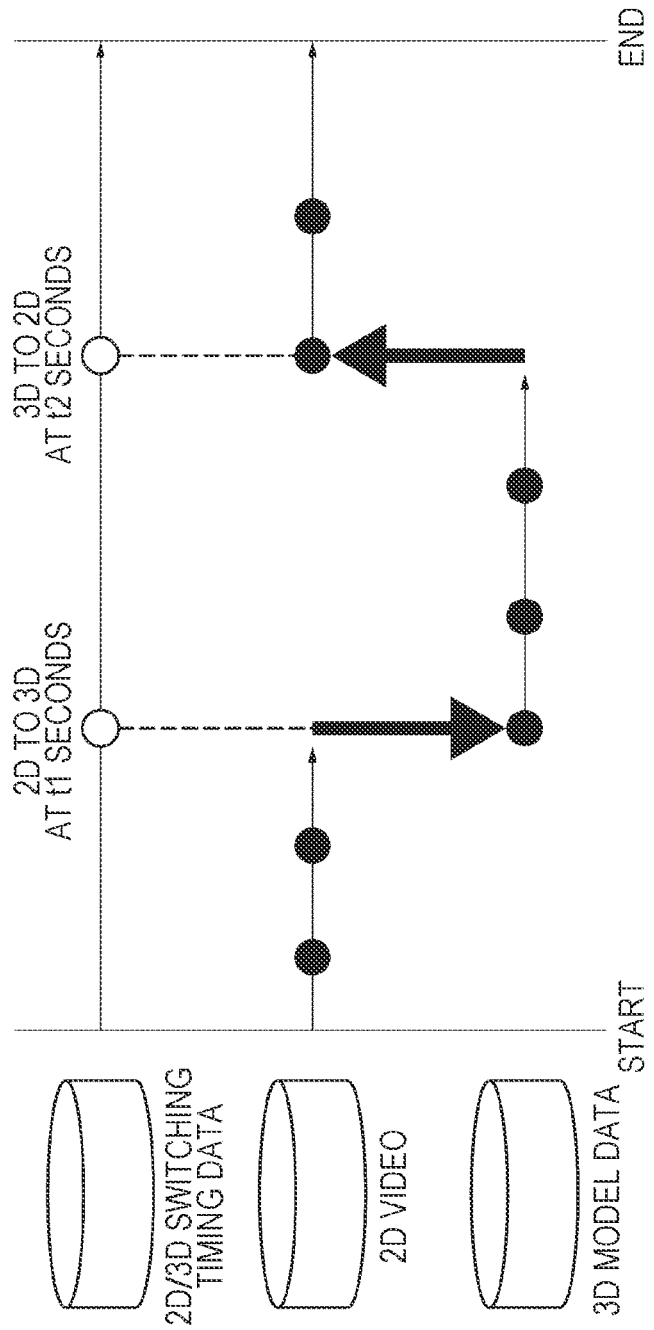
FIG. 11 is a diagram for explaining a data holding form in a storage unit according to the second embodiment.

FIG. 11 is a diagram for explaining a data holding form in the storage unit 104 according to the second embodiment. As illustrated in FIG. 11, in a section in which the first reproduction processing is performed according to the switching timing data (for example, switching timing data for displaying 3D data instead of 2D data at t1 seconds) (a section from the start of reproduction to t1 seconds later), only 2D data corresponding to the section is held. Furthermore, in a section in which the second reproduction processing is performed according to the switching timing data (for example, switching timing data for displaying 2D data instead of 3D data at t2 seconds) (a section from t1 seconds to t2 seconds later), only 3D data corresponding to the section is held. As a result, the storage capacity can be saved.

Figure 12:
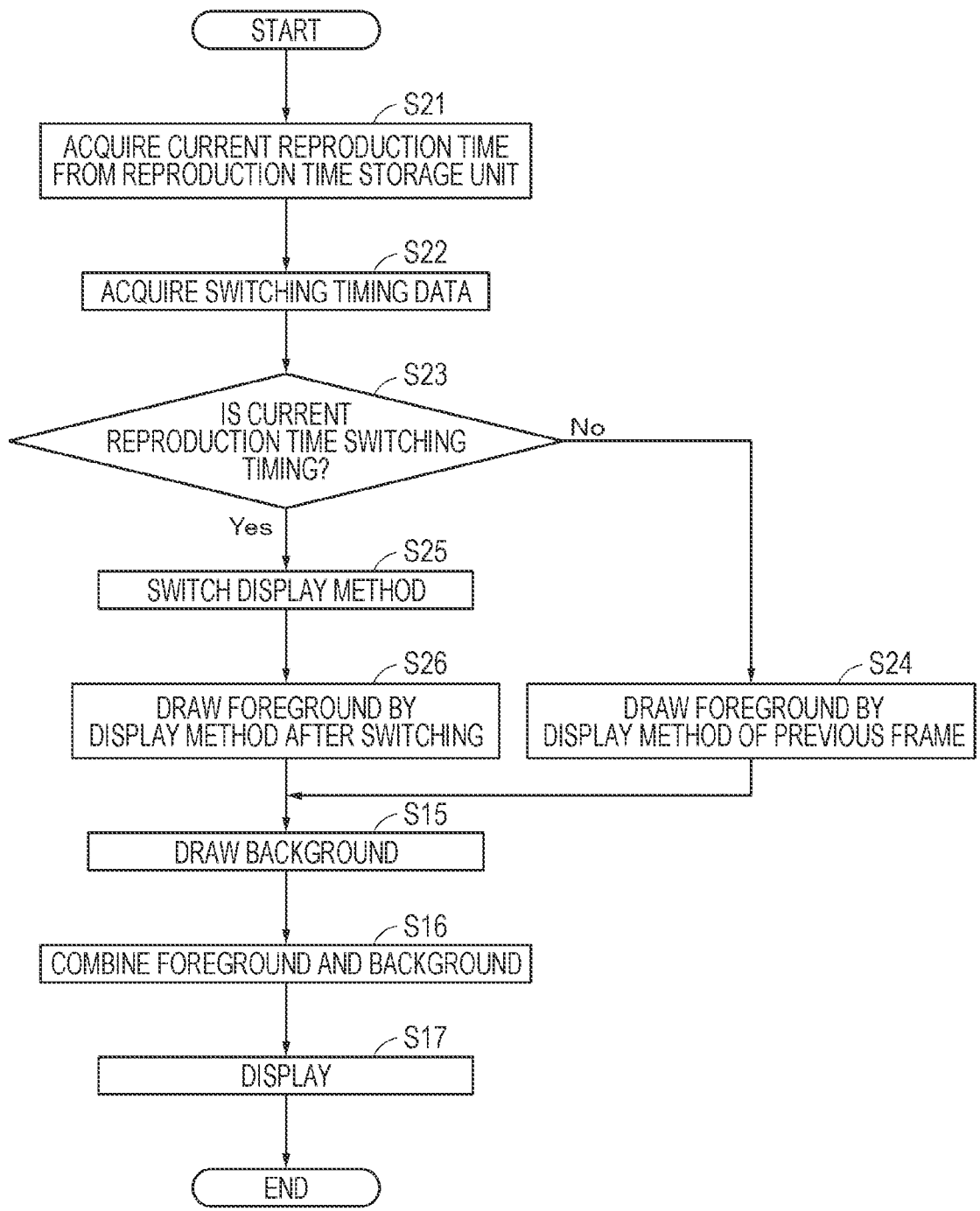
FIG. 12 is a flowchart for explaining an operation example of the information processing apparatus according to the second embodiment.

FIG. 12 is a flowchart for explaining an operation example of the information processing apparatus 200 according to the second embodiment.

In step S21, the 2D/3D switching determination unit 102 acquires the current reproduction time from the reproduction time storage unit 201. Then, the processing proceeds to step S22.

In step S22, the switching timing data is read by the switching timing data reading unit 202. The 2D/3D switching determination unit 102 acquires the read switching timing data. Note that the 2D/3D switching determination unit 102 may acquire the switching timing data before reproduction of the video data, or may acquire the switching timing data in real time. Then, the processing proceeds to step S23.

In step S23, the 2D/3D switching determination unit 102 determines whether or not the current reproduction time is the switching timing indicated by the switching timing data. When it is not the switching timing, the 2D/3D switching determination unit 102 notifies the 2D/3D switching control unit 103 of this fact. Then, the processing proceeds to step S24.

In step S24, the 2D/3D switching control unit 103 performs control so that the foreground is drawn by the display method of the previous frame. For example, in a case where the previous frame has been reproduced by the reproduction processing based on the 2D data, the 2D video drawing unit 106 draws the object in the foreground by the billboard rendering under the control of the 2D/3D switching control unit 103. Furthermore, for example, in a case where the previous frame has been reproduced by the reproduction processing based on the 3D data, the 3D model drawing unit 108 draws the object in the foreground with the 3D model under the control of the 2D/3D switching control unit 103. Then, the processing proceeds to step S15.

In step S23, in a case where the current reproduction time is the switching timing indicated by the switching timing data, the 2D/3D switching determination unit 102 notifies the 2D/3D switching control unit 103 of this fact. Then, the processing proceeds to step S25.

In step S25, the 2D/3D switching control unit 103 performs control to switch the display format. For example, in a case where the reproduction processing based on the 2D data has been performed so far, the 2D/3D switching control unit 103 performs control to operate the 3D model drawing unit 108 instead of the 2D video drawing unit 106. On the other hand, in a case where the reproduction processing based on the 3D data has been performed so far, the 2D/3D switching control unit 103 performs control to operate the 2D video drawing unit 106 instead of the 3D model drawing unit 108. Then, the processing proceeds to step S26.

In step S26, the 2D video drawing unit 106 or the 3D model drawing unit 108 corresponding to the display method after switching operates. As a result, the object is drawn in the foreground as a billboard rendering or a 3D model. Then, the processing proceeds to step S15.

Since the processing of steps S15 to S17 is similar to that of the first embodiment, redundant description will be omitted.

Third Embodiment

Next, a third embodiment will be described. The matters described in the first and second embodiments can be applied to the third embodiment unless otherwise specified. In addition, the same reference numerals are given to the same or similar configurations as those described in the first and second embodiments, and redundant description will be appropriately omitted.

Figure 13:
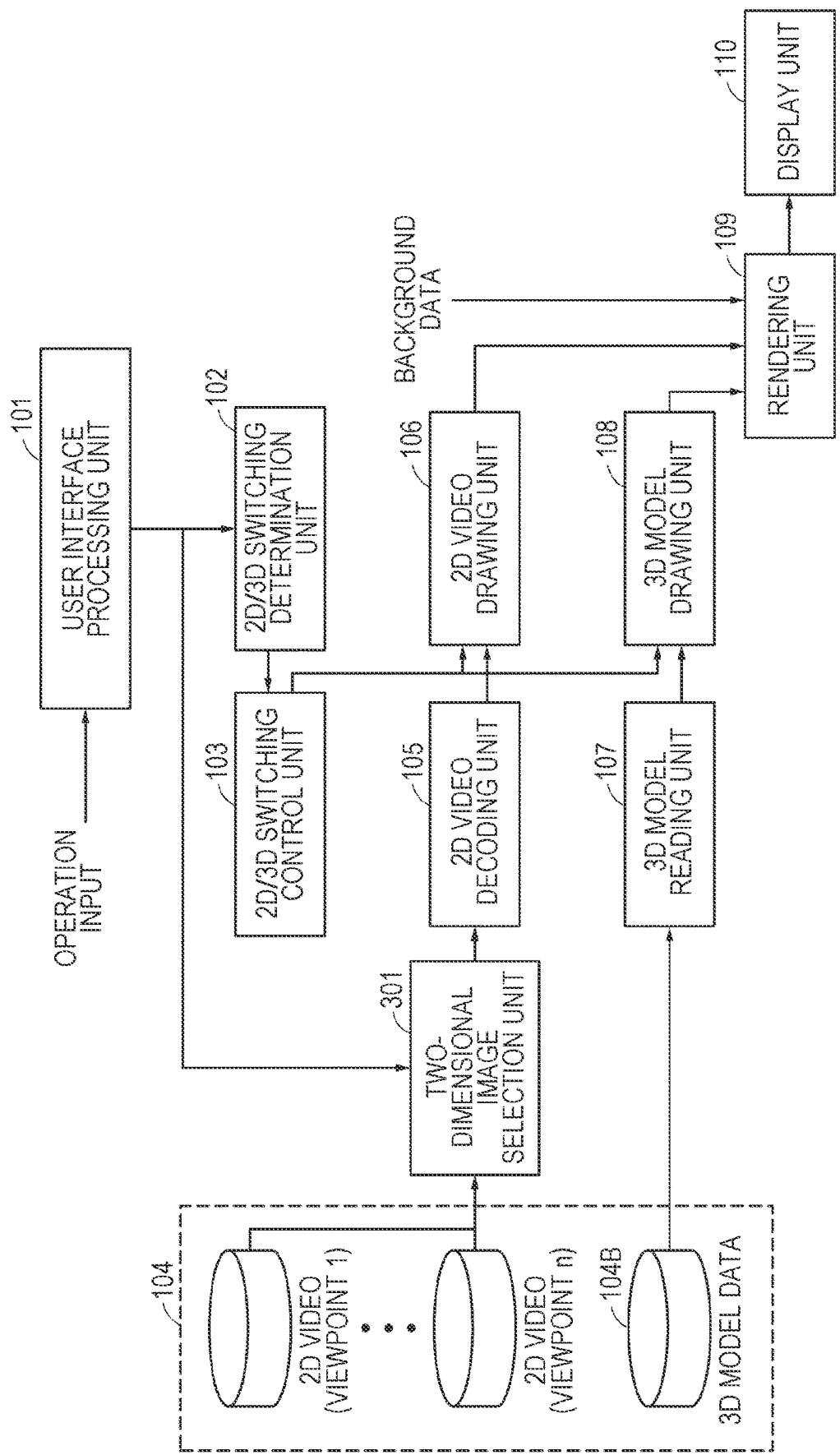
FIG. 13 is a diagram for explaining a configuration example of an information processing apparatus according to a third embodiment.
Figure 14:
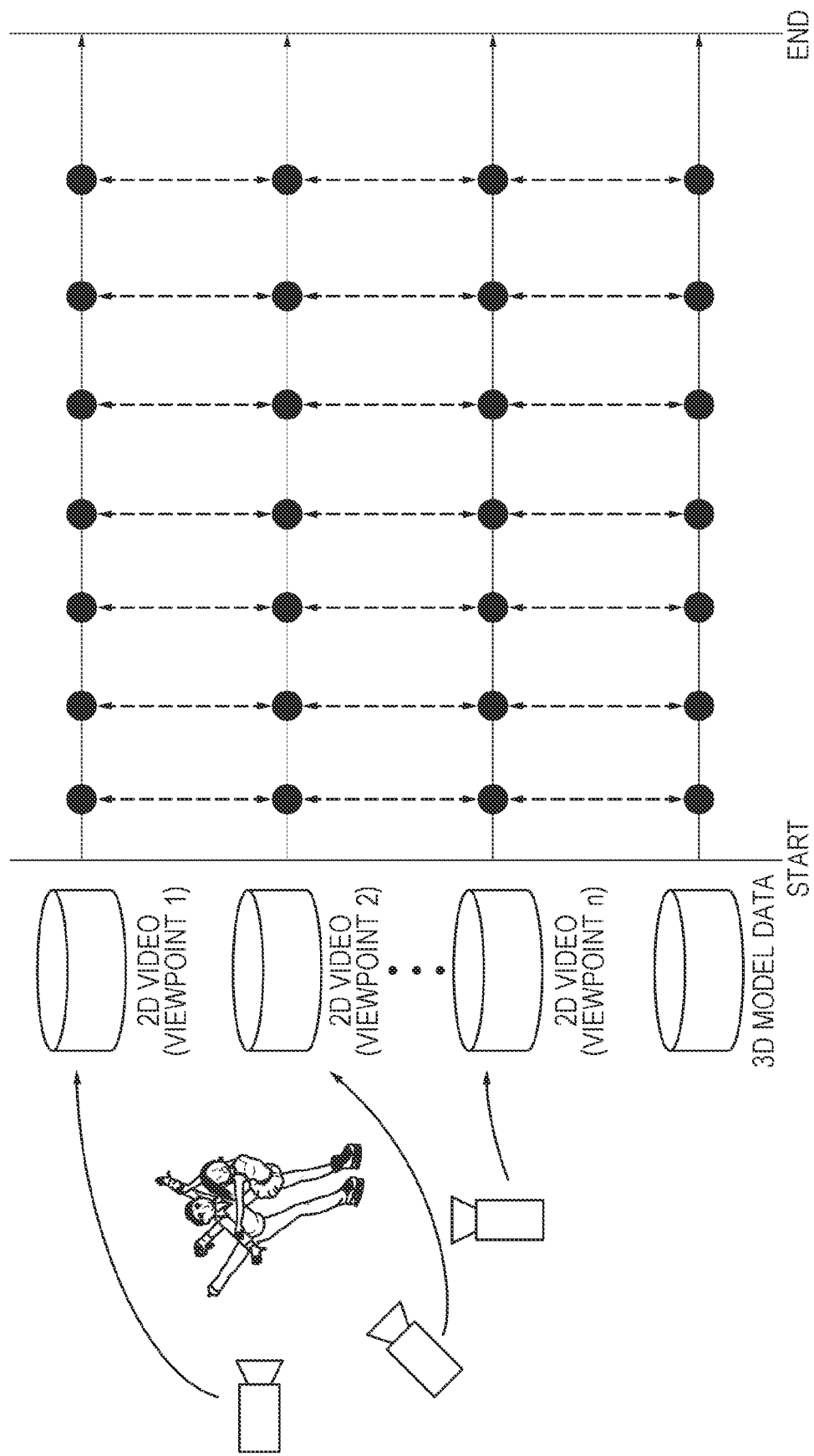
FIG. 14 is a diagram for explaining a data holding form in a storage unit according to the third embodiment.

FIG. 13 is a diagram illustrating a configuration example of an information processing apparatus (information processing apparatus 300) according to the third embodiment. The information processing apparatus 300 includes a two-dimensional image selection unit 301. Furthermore, the storage unit 104 of the information processing apparatus 300 stores a two-dimensional image set generated by capturing a three-dimensional model from a plurality of viewpoints. More specifically, as illustrated in FIG. 14, 2D data and 3D model data corresponding to each viewpoint at a predetermined timing are stored in the storage unit 104.

An operation example of the information processing apparatus 300 will be described. For example, it is assumed that the user performs an operation of changing the viewpoint in a case where the reproduction processing based on the 2D data is performed. Such an operation is detected by the user interface processing unit 101, and an operation input signal corresponding to the operation is supplied to the 2D/3D switching control unit 103 and the two-dimensional image selection unit 301.

The two-dimensional image selection unit 301 selects and reads 2D data corresponding to the viewpoint corresponding to the operation input signal, and supplies the read 2D data to the 2D video decoding unit 105. With this control, it is possible to display a video that does not cause visual discomfort even when the viewpoint of the user is changed.

By the way, by using the multi-viewpoint 2D data, the posture of the object based on the 2D data may not match the posture of the object based on the 3D model. Therefore, at the time of switching the reproduction processing, the posture of the displayed object is different, which may cause the user to experience discomfort. Therefore, in the information processing apparatus 300, before the switching by the 2D/3D switching control unit 103 is performed, control may be performed to bring the posture of the object before the switching closer to the posture of the object after the switching.

An example of such control will be specifically described with reference to sequence diagrams illustrated in FIGS. 15 and 16. The example illustrated in FIG. 15 is an example in which the 2D/3D switching determination unit 102 determines switching from the reproduction processing based on the 2D data to the reproduction processing based on the 3D data.

In step S31, the 2D/3D switching control unit 103 is notified of the determination result of the 2D/3D switching determination unit 102. In subsequent step S32, the 2D/3D switching control unit 103 controls the 3D model drawing unit 108. According to such control, the 3D model drawing unit 108 brings the posture closer by rotating the 3D model in a direction corresponding to the object being displayed as the two-dimensional image. In step S33, the 3D model drawing unit 108 notifies the 2D/3D switching control unit 103 that the rotation of the 3D model has ended. In step S34, the 2D/3D switching control unit 103 operates the 3D model drawing unit 108 instead of the 2D video drawing unit 106. As a result, in step S35, display of the 3D model is started.

The example illustrated in FIG. 16 is an example in which the 2D/3D switching determination unit 102 determines switching from the reproduction processing based on the 3D data to the reproduction processing based on the 2D data.

In step S41, the 2D/3D switching control unit 103 is notified of the determination result of the 2D/3D switching determination unit 102. In subsequent step S42, the 2D/3D switching control unit 103 controls the 2D video drawing unit 106. In accordance with such control, the 2D video drawing unit 106 rotates the billboard on which the object is displayed to an angle facing the user. In step S43, the 2D video drawing unit 106 notifies the 2D/3D switching control unit 103 that the rotation of the billboard has ended.

In step S44, the 2D/3D switching control unit 103 controls the 3D model drawing unit 108. In accordance with such control, the 3D model drawing unit 108 rotates the 3D model to an angle corresponding to the angle of the billboard. In step S45, the 3D model drawing unit 108 notifies the 2D/3D switching control unit 103 that the rotation of the 3D model has ended. In step S46, the 2D/3D switching control unit 103 operates the 2D video drawing unit 106 instead of the 3D model drawing unit 108. Accordingly, the display of the 3D model is ended. Then, in step S47, reproduction processing based on the 2D data is performed, and the object of the two-dimensional image is displayed.

By performing the processing described above, it is possible to reduce the posture deviation that may occur between the two-dimensional image and the three-dimensional model at the time of switching regarding the same subject as much as possible. As a result, it is possible to reduce the user's visual discomfort as much as possible.

Note that, in the above-described example, the posture of the three-dimensional model based on the 3D data is changed, but the posture of the object based on the 2D data may be changed by rotating the billboard in accordance with the angle of the 3D model.

Modification Example

Although the plurality of embodiments of the present disclosure has been specifically described above, the content of the present disclosure is not limited to the above-described embodiments, and various modifications based on the technical idea of the present disclosure are possible.

In the above-described embodiment, the 3D model data is held in advance, but the 3D model data may be generated in real time on the basis of the 2D data. Furthermore, in the above-described embodiment, the example in which the 2D data and the 3D data on the same subject held in advance are acquired by the information processing apparatus 100 has been described. However, the information processing apparatus 100 may acquire the 2D data and the 3D data on the same subject from a server device or the like by communication.

Some of the configurations and functions of the information processing apparatus according to the above-described embodiments may exist in a device (for example, a server device or the like on a network) different from the information processing apparatus. For example, the storage unit 104 may be a server device connectable to the information processing apparatus via a network.

Furthermore, for example, the program for realizing the above-described functions may be executed in any device. In that case, it is only required that the device has necessary functional blocks and can obtain necessary information. Furthermore, for example, each step of one flowchart may be executed by one device, or may be shared and executed by a plurality of devices. Furthermore, in a case where a plurality of pieces of processing is included in one step, the plurality of pieces of processing may be executed by one device, or may be shared and executed by a plurality of devices. In other words, a plurality of processes included in one step can also be executed as processing of a plurality of steps. Conversely, the processing described as a plurality of steps can be collectively executed as one step.

Furthermore, for example, in the program executed by the computer, processing of steps describing the program may be executed in time series in the order described in the present specification, or may be executed in parallel or individually at necessary timing such as when a call is made. That is, as long as there is no contradiction, the processing of each step may be executed in an order different from the above-described order. Furthermore, the processing of steps describing this program may be executed in parallel with the processing of another program, or may be executed in combination with the processing of another program. Furthermore, for example, a plurality of technologies related to the present technology can be implemented independently as a single body as long as there is no contradiction. It is needless to say that any of the plurality of present technologies can be implemented in combination. For example, some or all of the present technologies described in any embodiment can be implemented in combination with some or all of the present technologies described in other embodiments. Furthermore, some or all of any of the above-described present technologies can be implemented in combination with other technologies not described above.

Note that the contents of the present disclosure are not to be construed as being limited by the effects exemplified in the present specification.

The present disclosure can also adopt the following configurations.

(1)

An information processing apparatus including:
a switching control unit that holds 2D data and 3D data on the same subject and controls switching between first reproduction processing based on the 2D data and second reproduction processing based on the 3D data.

(2)

The information processing apparatus described in (1),
in which the switching control unit switches between the first reproduction processing and the second reproduction processing on the basis of a predetermined timing.

(3)

The information processing apparatus described in (2),
in which the predetermined timing is a timing at which a predetermined operation is performed on a controller.

(4)

The information processing apparatus described in (2),
in which the predetermined timing is a timing determined according to a relative positional relationship between a predetermined position and a user position in a virtual space.

(5)

The information processing apparatus described in (4),
in which the relative positional relationship is a distance between the predetermined position and the user position.

(6)

The information processing apparatus described in (5),
in which the switching control unit selects the first reproduction processing in a case where the distance is larger than a threshold value, and selects the second reproduction processing in a case where the distance is smaller than the threshold value.

(7)

The information processing apparatus described in (4),
in which the relative positional relationship is a positional relationship between a range of an angle set with reference to the predetermined position and the user position.

(8)

The information processing apparatus described in (7),
in which the switching control unit selects the first reproduction processing in a case where the user position is within a range of a predetermined angle, and selects the second reproduction processing in a case where the user position is not within the range of the predetermined angle.

(9)

The information processing apparatus described in (2), in which the predetermined timing is a preset timing.

(10)

The information processing apparatus described in (9), in which switching timing data indicating the preset timing is held.

(11)

The information processing apparatus described in (10), in which the 2D data corresponding to a section in which the first reproduction processing is performed by the switching timing data is held, and the 3D data corresponding to a section in which the second reproduction processing is performed by the switching timing data is held.

(12)

The information processing apparatus described in any of (1) to (11),
in which control is performed to bring a posture of the subject before switching and a posture of the subject after switching close to each other before the switching is performed by the switching control unit.

(13)

The information processing apparatus described in (12), in which the posture of the subject based on the 3D data is changed before switching is performed by the switching control unit.

(14)

The information processing apparatus described in (12), in which the posture of the subject based on the 2D data is changed before switching is performed by the switching control unit.

(15)

The information processing apparatus described in any of (1) to (14), further including:
a storage unit that holds the 2D data and the 3D data on the same subject.

(16)

An information processing method,
in which a switching control unit holds 2D data and 3D data on the same subject and controls switching between first reproduction processing based on the 2D data and second reproduction processing based on the 3D data.

(17)

A program that causes a computer to execute an information processing method,
in which a switching control unit holds 2D data and 3D data on the same subject and controls switching between first reproduction processing based on the 2D data and second reproduction processing based on the 3D data.

Application Example

The technology according to the present disclosure can be applied to various products and services.
(Production of Content)

For example, a new video content may be produced by combining the 3D model of the subject generated in the above-described embodiment with 3D data managed by another server. Furthermore, for example, in a case where background data acquired by an imaging device such as LiDAR is present, content as if the subject is at a place indicated by the background data can be produced by combining the 3D model of the subject generated in the above-described embodiment and the background data. Note that the video content may be three-dimensional video content or two-dimensional video content converted into two dimensions. Note that examples of the 3D model of the subject generated in the above-described embodiment include a 3D model generated by the 3D model generation unit 2 and a 3D model reconstructed by the rendering unit 6.
(Experience in Virtual Space)

For example, the subject (for example, a performer) generated in the present embodiment can be arranged in a virtual space that is a place where the user communicates as an avatar. In this case, the user becomes an avatar and can view the subject of the live-action image in the virtual space.
(Application to Communication with Remote Location)

For example, by transmitting the 3D model of the subject generated by the 3D model generation unit 2 from the transmission unit 4 to a remote location, a user at the remote location can view the 3D model of the subject through a reproduction device at the remote location. For example, by transmitting the 3D model of the subject in real time, the subject and the user at the remote location can communicate with each other in real time. For example, a case where the subject is a teacher and the user is a student, or a case where the subject is a doctor and the user is a patient is assumed.
(Others)

For example, a free viewpoint video of a sport or the like can be generated on the basis of the 3D models of the plurality of subjects generated in the above-described embodiment, or an individual can distribute himself/herself, which is the 3D model generated in the above-described embodiment, to the distribution platform. As described above, the contents in the embodiments described in the present specification can be applied to various technologies and services.

REFERENCE SIGNS LIST 100, 200, 300 Information processing apparatus
103 2D/3D switching control unit
104 Storage unit
106 2D video drawing unit
108 3D model drawing unit

The invention claimed is:

1. An information processing apparatus, comprising:
circuitry configured to:
acquire 2D data and 3D data on a first subject;
switch between a first rendering process and a second rendering process based on a specific timing; and
display one of the first rendering process based on the 2D data or the second rendering process based on the 3D data, wherein the specific timing is based on
a specific operation of a user, and
a relative positional relationship between a position of a second subject in a virtual space and the position of the user in the virtual space.

2. The information processing apparatus according to claim 1, wherein the specific timing is a timing at which the specific operation is performed on a controller.

3. The information processing apparatus according to claim 1, wherein the relative positional relationship is a distance between the position of the second subject and the position of the user.

4. The information processing apparatus according to claim 3, wherein the circuitry is further configured to:
select the first rendering process in a case where the distance is larger than a threshold value; and
select the second rendering process in a case where the distance is smaller than the threshold value.

5. The information processing apparatus according to claim 1, wherein the relative positional relationship is between a range of an angle set associated with the position of the second subject and the position of the user.

6. The information processing apparatus according to claim 5, wherein the circuitry is further configured to:
select the first rendering process in a case where the position of the user is in a range of a specific angle, wherein the specific angle is associated with the angle set; and
select the second rendering process in a case where the position of the user is not in the range of the specific angle.

7. The information processing apparatus according to claim 1, wherein the specific timing is a preset timing.

8. The information processing apparatus according to claim 7, wherein switching timing data indicates the preset timing.

9. The information processing apparatus according to claim 8, wherein
the 2D data corresponds to a first section associated with the first rendering process,
the 3D data corresponds to a second section associated with the second rendering process,
each of the first rendering process and the second rendering process is based on the switching timing data, and
the second section is different from the first section.

10. The information processing apparatus according to claim 1, wherein
an orientation of the first subject of the 3D data is matched with an orientation of a corresponding subject of the 2D data, and
an orientation of the first subject of the 2D data is matched with an orientation of a corresponding subject of the 3D data.

11. The information processing apparatus according to claim 10, wherein
the circuitry is further configured to change a posture of the first subject based on the 3D data, and
the change in the posture of the first subject is before the switch between the first rendering process and the second rendering process.

12. The information processing apparatus according to claim 10, wherein
the circuitry is further configured to change a posture of the first subject based on the 2D data, and
the change in the posture of the first subject is before the switch between the first rendering process and the second rendering process.

13. The information processing apparatus according to claim 1, further comprising a storage unit configured to store the 2D data and the 3D data.

14. An information processing method, comprising:
acquiring 2D data and 3D data on a first subject;
switching between a first rendering process and a second rendering process based on a specific timing; and
displaying one of the first rendering process based on the 2D data or the second rendering process based on the 3D data, wherein the specific timing is based on
an operation of a user, and
a relative positional relationship between a position of a second subject in a virtual space and the position of the user in the virtual space.

15. A non-transitory computer-readable medium having stored thereon, computer-executable instructions which, when executed by a computer, cause the computer to execute operations, the operations comprising:
acquiring 2D data and 3D data on a first subject;
switching between a first rendering process and a second rendering process based on a specific timing; and
displaying one of the first rendering process based on the 2D data or the second rendering process based on the 3D data, wherein the specific timing is based on
an operation of a user, and
a relative positional relationship between a position of a second subject in a virtual space and the position of the user in the virtual space.

16. An information processing apparatus, comprising:
circuitry configured to:
acquire 2D data and 3D data on the same subject; and
control switch between a first rendering process based on the 2D data and a second rendering process based on the 3D data, wherein
the switch between the first rendering process and the second rendering process is based on a specific timing, and
the specific timing is based on a relative positional relationship between a specific position in a virtual space and a user position in the virtual space.

* * * * *